(12) United States Patent
Loyd et al.

(10) Patent No.: US 6,608,693 B1
(45) Date of Patent: Aug. 19, 2003

(54) APPARATUS AND METHOD FOR GENERATING A PRINT JOB FROM A COMMAND STREAM DESCRIBING MULTIPLE COPIES OF A DOCUMENT

(75) Inventors: Gerald A. Loyd, Boise, ID (US); Shell S. Simpson, Boise, ID (US); Richard Detweiler, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/304,012

(22) Filed: Apr. 30, 1999

(51) Int. Cl.[7] ............................................... G06K 15/00
(52) U.S. Cl. ................... 358/1.13; 358/1.115
(58) Field of Search ................. 358/1.1, 1.12, 358/1.13, 1.6, 1.15, 1.18, 1.16, 1.17, 404, 444, 403, 401; 399/76, 77, 82, 83, 85, 383

(56) References Cited

U.S. PATENT DOCUMENTS 5,764,863 A    *    6/1998    Fall et al. .................. 358/1.13

* cited by examiner

*Primary Examiner*—Arthur G. Evans
(74) *Attorney, Agent, or Firm*—Matthew L. Wade (57) ABSTRACT

Apparatus and method for generating a print job from a device driver interface command stream (command stream) is described. The command stream describes multiple collated copies of a document but is in an undifferentiated form. The print job that is generated includes print data that describes only a single copy of the document and a command that indicates the number of printed copies that are to be printed.

20 Claims, 8 Drawing Sheets

APPARATUS AND METHOD FOR GENERATING A PRINT JOB FROM A COMMAND STREAM DESCRIBING MULTIPLE COPIES OF A DOCUMENT

CROSS REFERENCE TO RELATED APPLICATION

This application includes subject matter related to co-pending application entitled: "APPARATUS AND METHOD FOR GENERATING MULTIPLE ORIGINAL PRINTS" and is referred to herein as the '346 application. That application is incorporated by reference herein, assigned to the same assignee as this application and filed on even date herewith.

BACKGROUND OF THE INVENTION

There are many types of computing devices capable of generating or handling a document in an electronic form. For purposes of this application, such devices are generally referred to herein as "document processing devices". Examples of document processing devices include personal computers, printers, print servers, facsimile machines, digital cameras, digital copiers, optical scanners, medical imaging devices, satellite imaging devices and scientific data collection devices.

A typical printing system includes a document processing device (such as a personal computer) and a printer connected over a communication link. The document processing device including a software application (e.g., a word processing application) and a print driver. In order to generate a document in an electronic form, a user provides input (via some sort of user input device) to the software application (executing on the document processing device). To print the document, the user inputs a print request to the application. The application responds to this input by causing a series of commands describing the document to be transmitted to the print driver. For purposes of this application, the commands transmitted to the print driver may be referred to herein as "device driver interface" (DDI) commands or alternatively as the DDI command stream. The data used to represent a DDI command may be referred to herein as DDI command data.

It is often the case that a user has a need to print multiple collated copies of a document. Many of the printing systems that exist today provide a user with the ability to use one of two techniques to satisfy this need. First, the user can cause the document processing device to generate multiple print jobs, each print job describing only a single copy of the document. The print jobs (as they are generated) are transmitted sequentially over a communication link to a printer, thereby causing the printer to print the desired number of copies.

Unfortunately, this first technique can result in a large amount of data having to be processed (both by the document processing device and by the printer) and a large amount of print data having to be transmitted over the communication link. As a result, this first technique can result in printing delays and data transfer bandwidth problems. In addition, documents copies from other print jobs may be interspersed within the copies.

In a second technique, a user causes the document processing device to generate a single print job describing a single copy of the document. The print job is then transmitted once to the printer for printing. After the single copy is printed, the user then retrieves it from the printer and makes use of a photocopier to generate the additional copies desired. Unfortunately, this second technique typically requires the purchase, operation and maintenance of a photocopier. This represents an added expense beyond that of owning and maintaining a printer. Furthermore, user productivity is also reduced as the user must transport the original printed copy to the photocopier and must also spend time operating the photocopier. Also, the quality of the copies generated from a photocopier will typically be below that of the original document printed from the printer.

To solve the problems mentioned above, printing systems have been developed that allow for multiple copies of a document to be printed from a single transmission of a print job. The print job including a single command (indicating the number of copies that are to be printed) followed by print data (describing a single copy of the document). Printers that are able to receive this type of print job are described in the patent entitled MULTIPLE ORIGINAL COPY DATA PRINTER, having U.S. Pat. No. 5,764,863. The technology described in that patent may be referred to as "TOPAZ". TOPAZ is an acronym for "transmit once, print a zillion". Prior art printers incorporating the TOPAZ technology are able to accept print jobs that include print data describing a single copy of a document and a command, referred to herein as a "copy_count" command. The copy_count command indicates to the printer the number (referred to herein as the copy count value) of printed copies of the document desired.

For purposes of this discussion, a print job that includes a command indicating the number of times the print data in the print job is to be printed is referred to herein as a "mopy print job" (mopy is an acronym for "multiple original prints"). A printer able to receive a mopy print job may be referred to herein as a "mopy printer". A print driver that is able to generate a mopy print job may be referred to herein as a "mopy print driver".

As is known in the art, prior art mopy print jobs typically include setup commands that preface the print data. These setup commands may be expressed, for example, in Printer Job Language (PJL). PJL is a command language developed by the Hewlett Packard company.

For purposes of this application, the set of commands that preface the print data in a print job is referred to herein as the "preamble section" of the print job. Any commands that occur after the print data is referred to as the "trailer section" of the print job. It is known in the art that prior art mopy printers require the copy_count command to be in the preamble section of the print job.

In order for a prior art mopy print driver to properly generate a mopy print job, it must receive a suitable set of DDI commands. For ease of discussion, such a set of DDI commands is referred to herein as a "mopy enabled" set of DDI commands. Typically, a mopy enabled set of DDI commands will include an indication of the number of copies that are to be printed. In addition, a mopy enabled set of DDI commands includes DDI commands that describe only a single copy of the document and DDI commands describing any desired finishing information (e.g., a DDI command indicating each copy is to be stapled). A mopy print driver receives these commands and generates the mopy print job. The mopy print job having a command indicating the number of copies that are to be printed, additional commands indicating finishing information and print data describing only a single copy of the document.

Unfortunately, some applications (referred to herein as "non-mopy applications") are not designed to generate a mopy enabled set of DDI commands. To illustrate the problems a non-mopy application can cause, consider the DDI commands listed in Table 1. The DDI commands in table 1 provide an example of a DDI command stream provided to a mopy print driver from a non-mopy application. In this example, it is assumed that the document being converted into a print job is a two page document and that a user has requested (via input to the non-mopy application) two printed collated copies of the document.

TABLE 1

| DDI Commands (in order received by print driver) | Comment |
| --- | --- |
| Start_Job Command | indicates new print job is to be generated |
| Start_Page Command | indicates start of a new page |
| {Page Description Commands} | DDI commands describing first page (first copy) |
| End_Page Command | Indicates end of page |
| Start_Page Command | |
| {Page Description Commands} | DDI commands describing second page (first copy) |
| End_Page Command | |
| Start_Page Command | |
| {Page Description Commands} | DDI commands describing first page (Second Copy) |
| End Page Command | |
| Start_Page Command | |
| {Page Description Commands} | DDI commands describing second page (Second Copy) |
| End_Page Command | |
| End_Job | Indicates end of print job |

It can be seen that the DDI commands listed in Table 1 describe two collated copies of the two page document. Unfortunately, however, the commands describing each copy of the document are in an "undifferentiated form". That is to say, there is no indication where the first set of DDI commands describing the first copy ends and the next set of DDI commands describing the second copy begins. Furthermore, there is no indication that more than one copy of the document is to be printed.

For purposes of this application, a command stream (expressed in any language) that describes multiple collated copies of a document is referred to herein as an "undifferentiated command stream". In addition, each set of commands in the command stream that describes a single copy of a document is referred to herein as a "single copy command set". Thus, the command stream illustrated in Table 1 is an example of an undifferentiated DDI command stream.

Upon receiving the undifferentiated DDI command stream illustrated in Table 1, a typical prior art mopy print driver generates a single print job. The print job includes a command indicating one copy is to be printed followed by print data describing two copies of the document. The print job is then transmitted to the printer for printing. As a result, roughly twice as much print data is transmitted to the printer than that required to describe the document. As indicated above, this can cause data transfer bandwidth problems and printing delays. Of course this problem gets worse as the number of copies the user requests to be printed increases.

In addition, certain finishing operations that require knowledge of copy boundaries may be applied incorrectly during the printing operation. For example, if the DDI commands listed in table 1 further described a stapling operation, the resulting print job may cause the printer to generate two printed copies of the document with all four of the pages stapled together.

SUMMARY OF THE INVENTION

In one embodiment of the present invention, a method of generating a print job from a command stream describing a plurality of copies of a document is provided. The method includes identifying a first set of marking data for a page represented in the command stream; using the marking data to identify a single set of commands in the command stream that describes the document; and using the single set of commands to generate the print job. The print job includes print data that describes only a single copy of the document and a command indicating the number of copies of the document that are to be printed.

In another embodiment, a document processing device is provided. The document processing device is for generating a print job from a command stream describing multiple copies of a document. The document processing device includes: means for identifying a first set of marking data for a page represented in the command stream; means for using the marking data to identify a single set of commands in the command stream, the single set of commands describing the document; and means for using the single set of commands to generate the print job.

In yet another embodiment, a computer-readable medium is provided. The computer readable medium having computer-executable instructions for performing steps to generate a print job from a command stream describing a plurality of copies of a document. The steps include: identifying marking data for a page in the document; using the marking data to identify a single set of commands in the command stream describing the document; and using the single set of commands to generate the print job.

In yet another embodiment, a document processing device is provided that comprises print job receiver. The print job includes print data that describes a plurality of copies of a document. The document processing device further includes means for identifying marking data for a page represented in the print data and also means for using the marking data to identify a first portion of the print data describing a single copy of the document.

DETAILED DESCRIPTION OF THE INVENTION

Before describing the first embodiment of the present invention, some preliminary discussion is first provided.

As indicated above, for purposes of this application, the phrase "undifferentiated command stream" refers to a command stream that describes multiple collated copies of a document. An undifferentiated command stream may be, for example, a series of DDI commands or print data. The print data may be expressed, for example, in Printer control Language (PCL) or PostScript. (PostScript is a trademark of Adobe Systems Incorporated).

Typically, an undifferentiated command stream will include a set of commands that repeat in the command stream for each identical page represented in the command stream. Such a set of commands are referred to herein as "marking commands". The data that describes marking commands are referred to herein as "marking data".

Referring again to Table 1, it is understood by a person skilled in the art that the page description commands for the first page (first copy) and the page description commands for the first page (second copy) are typically not identical, even though the two pages are identical. For example, it is often the case that the first page (first copy) page description commands will include DDI commands that provide the print driver with font information. These DDI commands are typically only transmitted once and are not included in the first page (second copy) page description commands. As is known in the art, however, the page description commands also will include a set of marking commands. Thus, for example, the page description commands describing the first page (first copy) of the document will include a set of marking commands. This set of marking commands are repeated for the first page (second copy) of the document because these two pages are identical.

Typically, the marking commands for a page are generally those page description commands that define the marks that are to be printed on the page. It is also noted that marking commands for any one page can be identified by performing a relatively simple parsing routine to the page description commands for the page.

Figure 1:
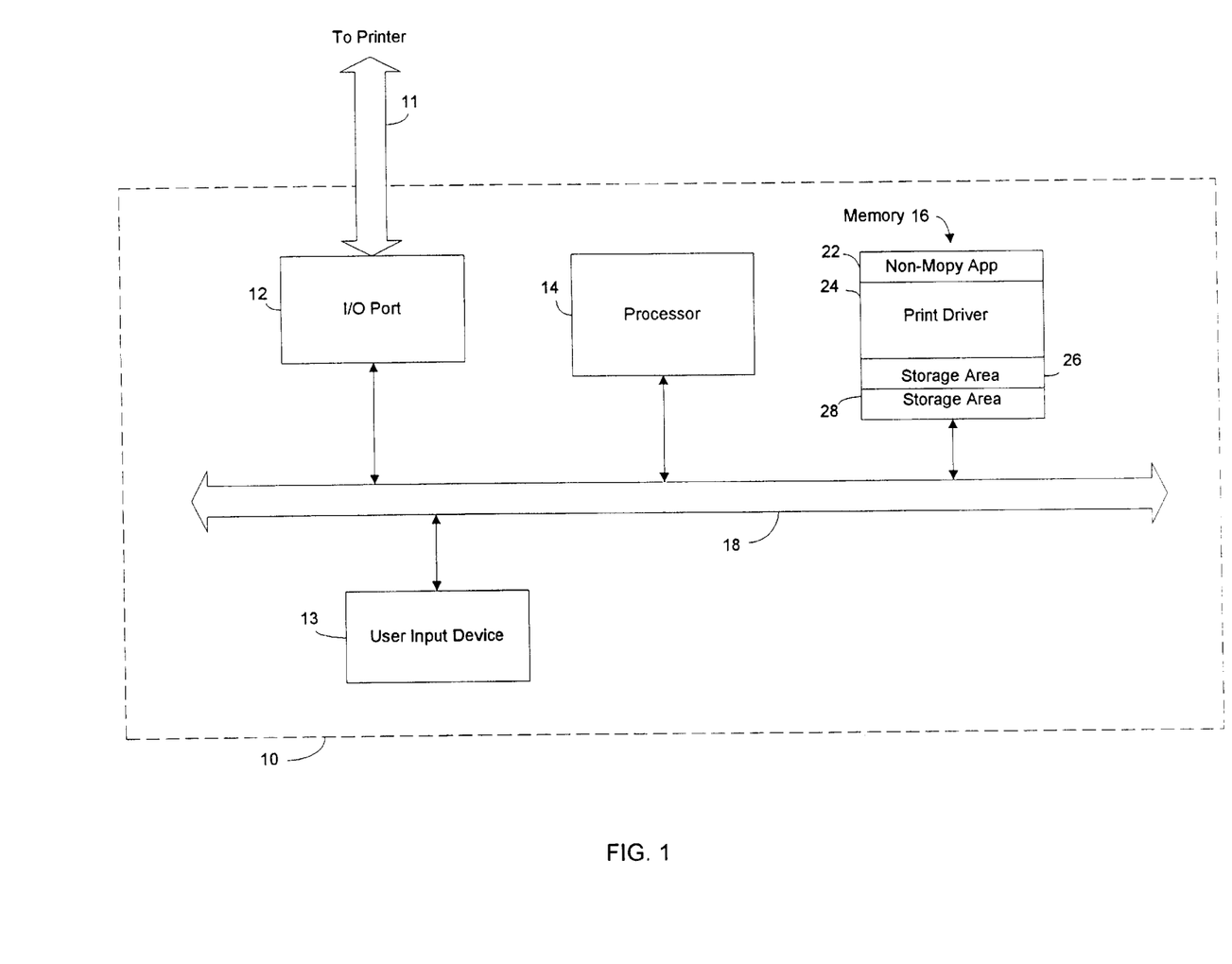
FIG. 1 depicts a high level circuit block diagram of a personal computer that incorporates an embodiment of the present invention.

To illustrate a first aspect of the present invention, attention is initially directed to FIG. 1. FIG. 1 depicts a high level circuit block diagram of personal computer (PC) 10 which incorporates an embodiment of the present invention. As shown, PC 10 includes a processor 14, an Input/Output (I/O) port 12, user input device 13 and memory 16 all interconnected via bus 18. As indicated, I/O port 12 provides communication capability over communication link 11 to a printer. In this example, it is assumed the printer is a prior art mopy printer that incorporates TOPAZ technology. Thus, the printer is able to respond to mopy print jobs that include a copy count command in the preamble section of the print job.

Memory 16 may consist of one or more storage devices, such as one or more disk drives, read-only memory (ROM) or random access memory (RAM). Stored in memory 16 is a typical non-mopy application (non-mopy application) 22, a mopy print driver (print driver) 24. It is noted that print driver 24 may have been originally read into memory 16 from a separate computer readable medium, such as a diskette or CD ROM. Alternatively, print driver 24 may have been downloaded over communication link 11. In addition, print driver 24 is illustrated and described herein as one program. It is to be understood, however, that print driver 24 may represent more than one program.

As shown, memory 16 further includes two read-writeable storage areas, storage area 26 and storage area 28. It is also noted that user input device 13 may be any suitable device (e.g., keyboard or pointer device or both) that enables a user to provide input to non-mopy application 22 while non-mopy application 22 is executed by processor 14.

Figure 2:
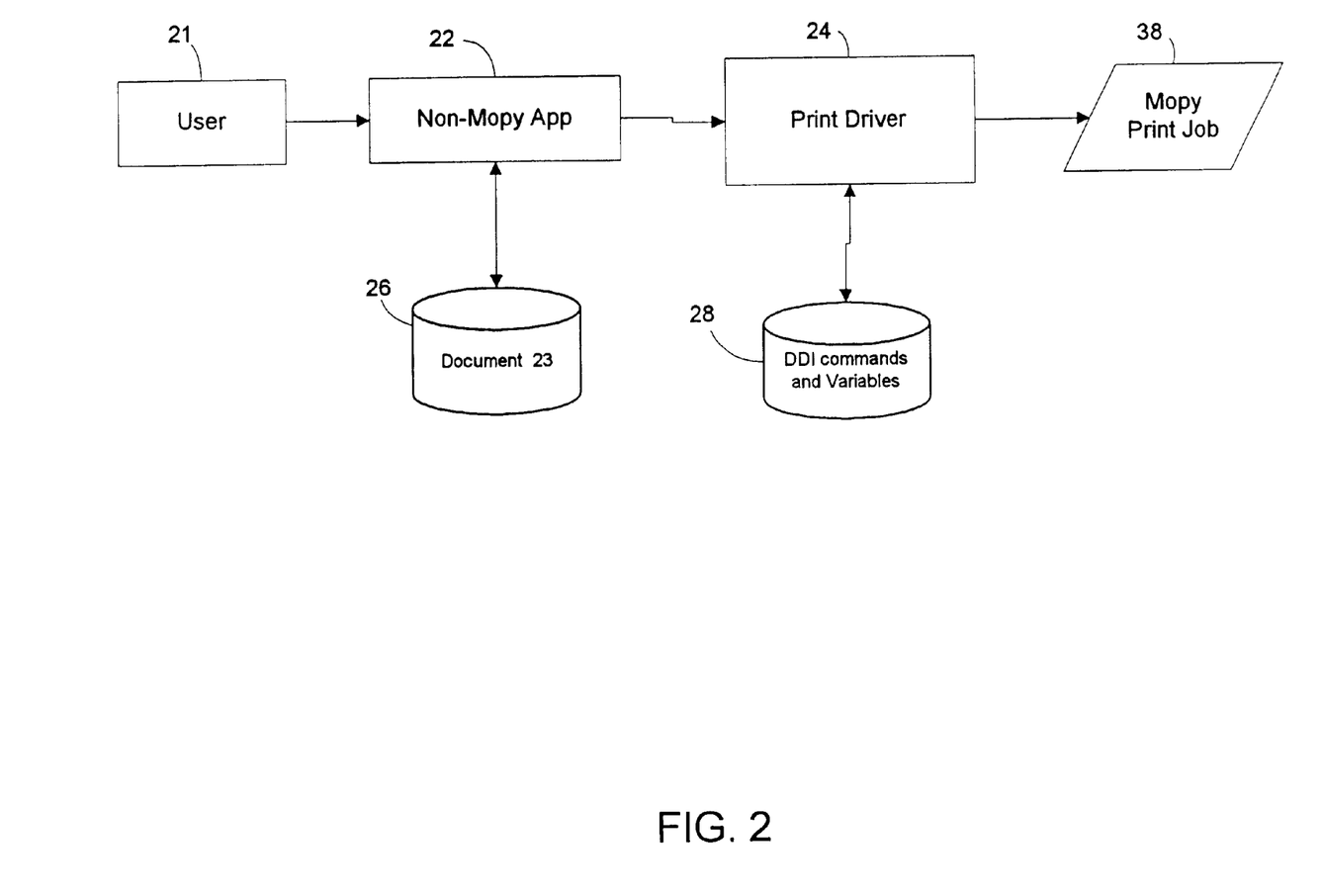
FIG. 2 depicts, in abstract form, an information flow diagram to illustrate the information that may be passed to a non-mopy application and a print driver as each program is being executed by a processor.

FIG. 2 depicts, in abstract form, an information flow diagram to illustrate the information that may be passed to non-mopy application 22 and to print driver 24 as each program is being executed by processor 14. In operation, a user 21 provides input to non-mopy application 22 (via user input device 13) so as to generate an electronic document, such as document 23. The document may then be stored as shown in storage area 26. After document 23 is generated, user 21 may provide further input to non-mopy application 22 in order to print multiple collated copies of document 23. Part of this input is the number (i.e., copy count value) of printed copies desired and that the copies are to be collated. Non-mopy application 22 responds to this input by causing an undifferentiated DDI command stream (command stream) to be generated. The command stream describing each copy of document 23. Thus, the command stream consists of multiple undifferentiated single copy command sets, each single copy command set describing a single copy of document 23. The number of single copy command sets in the command stream being equal to the copy count value.

According to the principles of the present invention, print driver 24 operates by writing the DDI commands as they are received into storage area 28. As the commands are being written into storage area 28, print driver 24 identifies the marking data for the first page represented in the command stream. For convenience of discussion, this set of marking data may be referred to herein as "first page marking data". As indicated above, the first page represented in the command stream is the first page (first copy) of document 23. Thus, the first page marking data is for the first page (first copy) of document 23.

As indicated above, marking data for a page may be identified by parsing the command data (i.e., the data describing the DDI commands) that describe each marking command for the page. Thus, for example, the first page marking data can be identified by parsing the data describing each marking command that exists between the first Start_Page command and the first End_Page command in the command stream.

After the first page marking data has been identified, print driver 24 then proceeds to test subsequent pages represented in the command stream. This is to identify the very next page represented in the command stream that meet a first and a second criterion (both of these criterion are described below). For ease of discussion, a page that is currently being tested by print driver 24 is referred to as a "current test page". In addition, a current test page that is determined to meet the first and a second criterion is referred to herein as a "boundary page". The boundary page is assumed to be, within an acceptable level of certainty, the first page (second copy) of document 23.

A current test page meets the first criterion if it is identical to the first page represented in the command stream. It can be seen that if the current test page is identical to the first page, it may be the first page (second copy) of the document.

In order to determine if a current test page meets the first criterion, print driver 24 first identifies the marking data for the current test page. Next, print driver 24 determines if the marking data for the current test page is identical to the first page marking data. If so, then print driver 24 determines that the current test page meets the first criterion (i.e., the current test page is identical to the first page of the document). If not, it is determined that the current test page does not meet the first criterion.

It is noted that there are any number of suitable techniques that could be used by print driver 24 to determine that the marking data for the current test page is identical to the first page marking data. The prior art (such as the art associated with ensuring reliably transfer of data over a communication link) is replete with techniques that could be used. In the present embodiment, for example, print driver 24 calculates a cyclic redundancy code (CRC) value for the first page marking data and also for the current test page marking data. The two CRC values are then compared to determine if the two CRC values are equal (as is known in the art, if two CRC values for two sets of data are equal, then it is very likely that the two sets of data are also identical). Thus, if the two CRC values are determined to be equal, then print driver 24 determines that the current test page meets the first criterion. If the two CRC values are not equal, then print driver 24 determines that the current test page does not meet the first criterion.

In this embodiment, a current test page meets the second criterion if it meets the first criterion and one of the following conditions is satisfied:

(a) the current test page is not blank; or
(b) each "associated page set" tested is determined to consist of identical pages.

For ease of discussion, these two conditions are referred to herein as "condition (a)" and "condition (b)".

Figure 3:
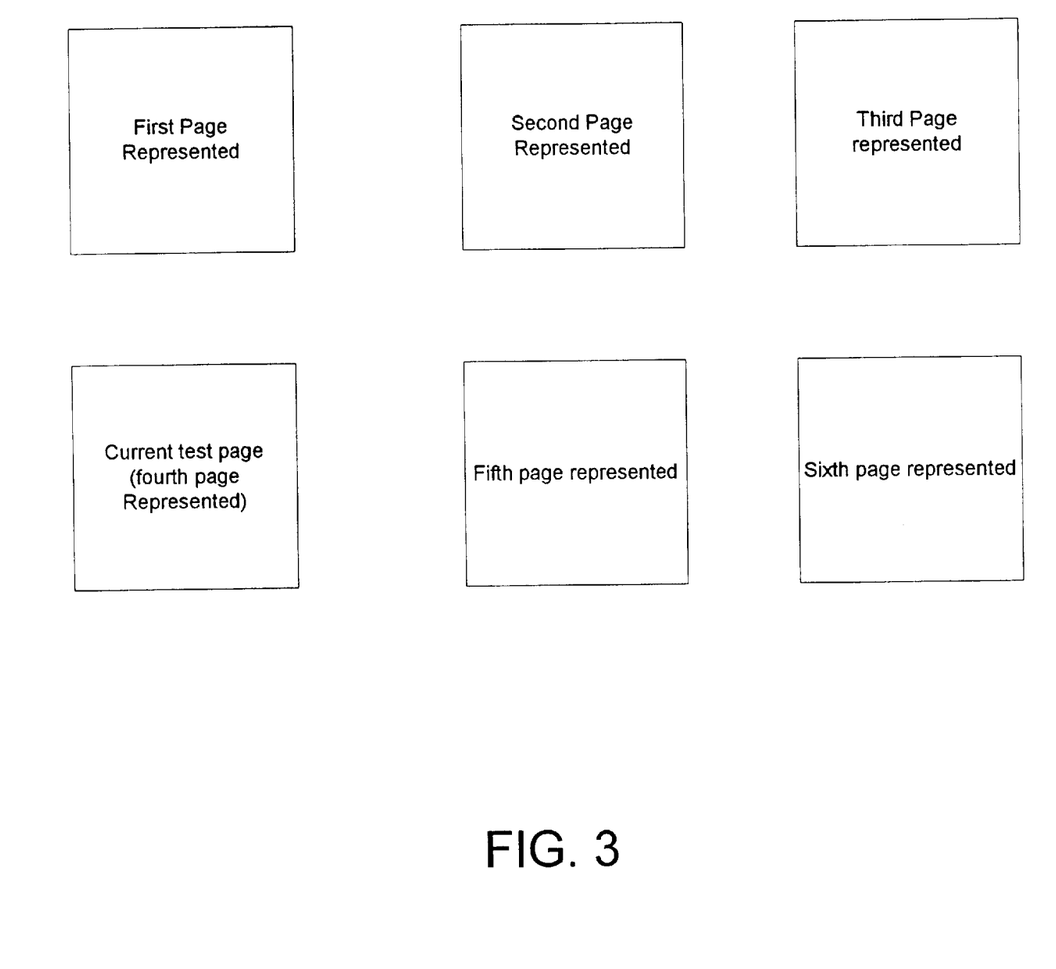
FIG. 3 illustrates an example of six pages in the order each page is represented in a typical DDI command stream.

In order to describe the meaning of the phrase "associated page set" the reader is briefly referred to FIG. 3. FIG. 3 illustrates an example of six pages in the order each page is represented in a typical command stream generated by non-mopy application 22. It is assumed in this example, that the fourth page represented in the command stream is a current test page that meets the first criterion. Thus, the fourth page is identical to the first page of the document and may be the first page (second copy) of the document.

It can be seen that if the current test page is in fact the first page (second copy) of the document, then certain pages represented in the command stream must also be identical. For example, the fifth page represented in the command stream must be identical to the second page represented in the command stream as both of these pages would represent page two of the document. Likewise, the sixth page must be identical to the third page as both of these pages would represent the third page of the document.

The phrase "associated page set" for a current test page refers to two or more pages which must be identical if the current test page is in fact the first page (second copy) of a document. In the present embodiment, an associated page set is assumed to consist of two pages. Thus, in FIG. 3 the fifth page and the second page represented in the command stream would make up a first two page associated page set. Likewise, the sixth page and the third page represented in the command stream would make up a second two page associated page set. Importantly, it can be seen that if the pages in any associated page set for the current test page is not identical, then the current test page could not be the first page (second copy) of the document. Instead, the current test page is a page in the document that is identical to the first page.

Referring again to FIG. 2, in order to determine if the current test page meets the second criterion, print driver 24 (after determining that the current test page has met the first criterion) determines if one of the two conditions listed above (i.e., condition (a) or condition (b)) is satisfied.

As indicated above, condition (a) is satisfied if the current test page is not blank. In this embodiment, print driver 24 makes this determination by analyzing the marking data for the current test page. For example, if the size of the marking data for the current test page is above a certain threshold limit, such as one-hundred bytes, then the current test page is determined not to be blank (and condition (a) is satisfied). If, however, the size of the marking data is below this threshold, then the current test page is determined to be blank (and condition (a) not satisfied).

If it is determined that the current test page meets the first criteria but condition (a) is not satisfied, then print driver 24 determines if condition (b) is satisfied. As indicated above, condition (b) is satisfied if each associated page set that is tested consists of identical pages and one associated page set tested consists of pages that are not blank.

Print driver 24, in the present embodiment, tests an associated page set by identifying the marking data for each page in the associated page set, calculating a CRC value for each set of marking data and then comparing the two CRC values to determine if the two values are equal. If the two CRC values are determined to be equal, then print driver 24 determines that the two pages in the associated page set are identical.

It is noted that the number of associated page sets that are tested before print driver 24 determines that condition (b) is satisfied is a design choice and is related to the degree of certainty which is desired that the current test page is indeed the first page (second copy) of the document. In this embodiment, the first associated page set that is tested includes the first page represented in the command stream after the current test page and the appropriate page represented before the current test page. Whether or not a second associated page set is tested is dependent upon whether or not the first associated page set consists of blank pages. If the pages in the first associated page set are not blank, then print driver 24 does not test additional associated page sets. If, however, the first associated page set consists of blank pages, then print driver 24 tests a second associated page set. The second associated page set includes the second page represented in the command stream after the current test page and an appropriate page represented prior to the current test page. This continues until print driver 24 tests an associated page set that consists of pages that are not blank or the associated page sets represented in the command stream are exhausted.

If print driver 24 is unable to identify a current test page that meets the first and second criterion, then it is assumed that the command stream describes only a single copy of a document. Standard techniques are then used to convert the command stream into mopy print job 38.

If, however, print driver 24 is able to identify a boundary page (i.e. a current test page that meets both criteria), the position of the commands in the command stream that describe the boundary page is then used to identify the first set of DDI commands (i.e., a single copy command set) in the command stream that describe a single copy of the document. This is accomplished by assuming that the single copy command set is the set of commands describing each page represented in the command stream prior to the commands describing the boundary page. For example, assume that current test page depicted in FIG. 3 is determined to meet both the first and second criteria (i.e., the current test page is determined to be a boundary page). The single copy command set is then identified as the set of commands describing the first, second and third pages represented in the command stream.

In addition, after (or during) the identification of the boundary page, print driver 24 then determines the number of single copy command sets represented in the entire command stream. This number is presumed to be the number (copy count value) of printed document copies requested by the user.

After the copy count value has been determined, print driver 24 then follows a standard routine to convert the single copy command set and the copy count value into mopy print job 38. Mopy print job 38 consists of a preamble section including a copy count command indicating the copy count value and print data that, within an acceptable level of certainty, describes a single copy of document 23. Mopy print job 38 may then be transmitted over communication link 11 to the mopy printer for printing.

As just shown, the present invention provides a technique for converting an undifferentiated DDI command stream into a mopy print job. Importantly, the mopy print job that is generated includes print data that describes only a single copy of the document. As indicated above, this results in less print data having to be transferred over the communication link to the printer as compared to prior art techniques. In addition, the copy boundaries are known. Therefore, any finishing operations (such as stapling) that are intended to be applied to each copy, is now correctly applied during the printing operation.

As indicated above, PC 10 generates mopy print jobs that have a command structure that can be received by prior art mopy printers. As previously mentioned, this requires that the copy_count command to be in the preamble section of the print job. Thus, PC 10 must transmit the copy_count command to the mopy printer prior to transmitting the print data. In order for PC 10 to generate the copy_count command, it must process nearly the entire command stream. Under certain situations, this may result in printing performance issues.

In the next embodiment of the present invention, the techniques described in the '346 application are used in conjunction with the present invention. As will be best understood in light of the following description, this second embodiment can result in enhanced printing system performance under certain circumstances over the embodiment just described.

Figure 4:
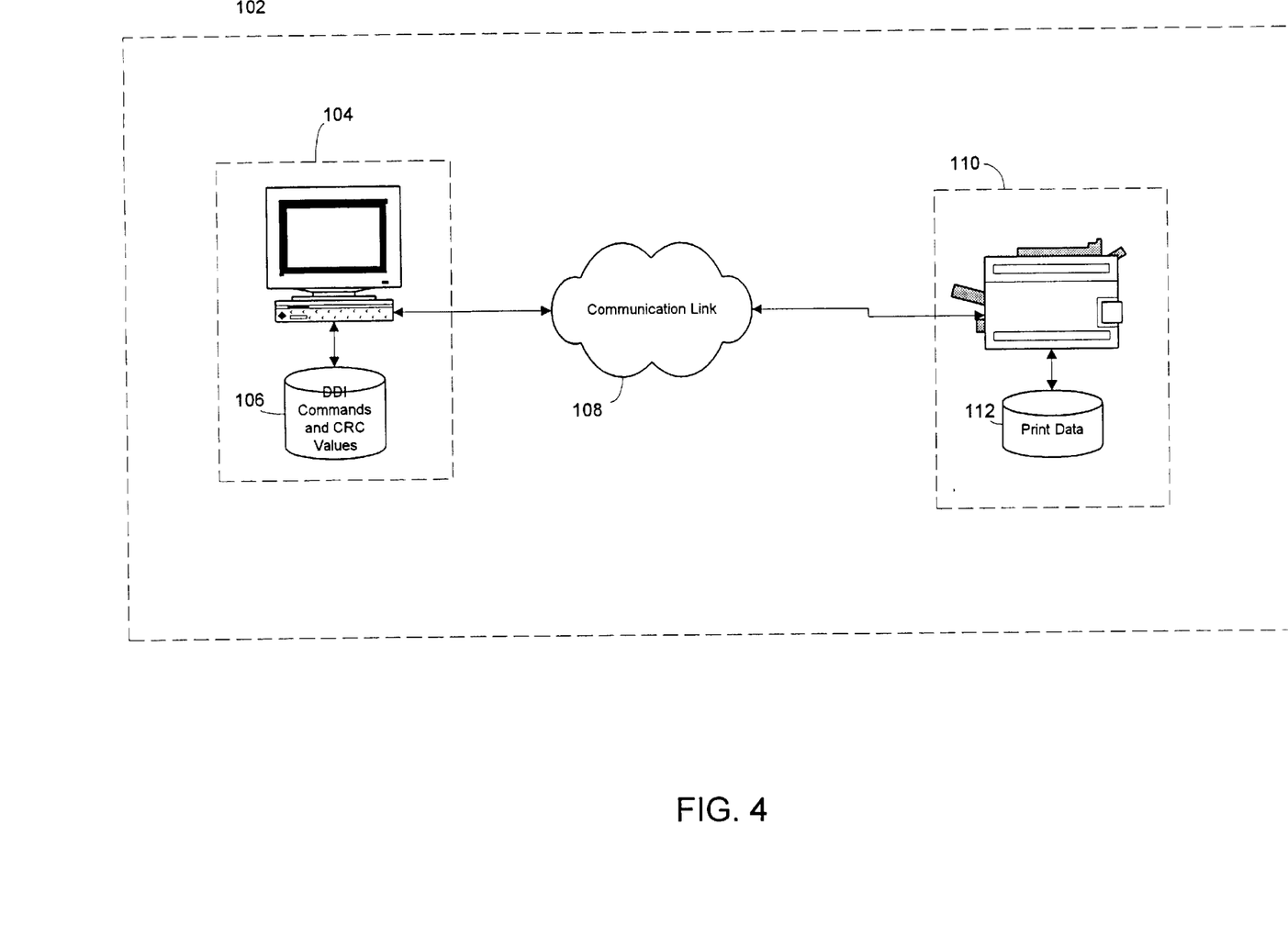
FIG. 4 illustrates a printing system incorporating another embodiment of the present invention.
Figure 5:
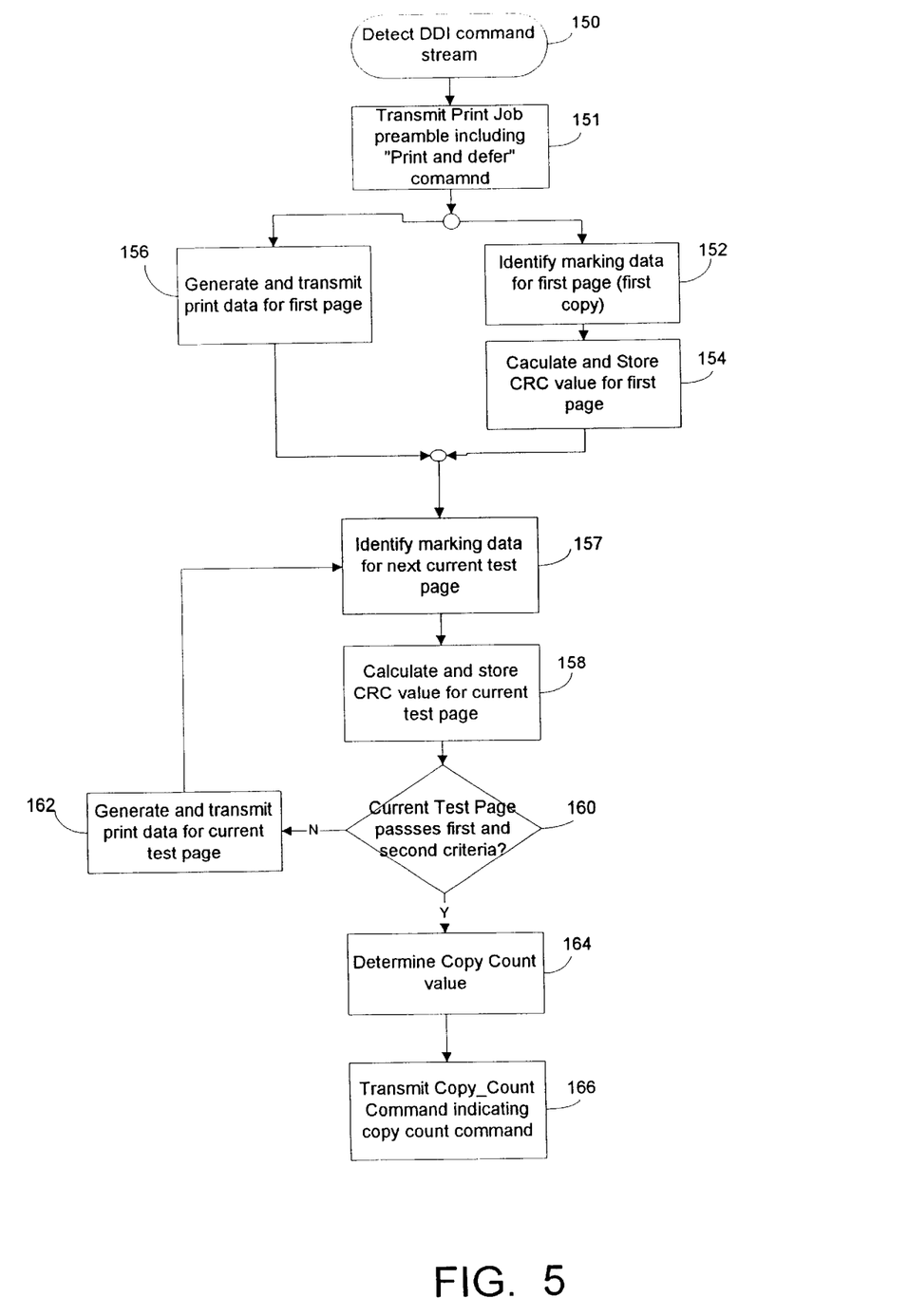
FIG. 5 is a flow diagram for illustrating a routine that may be followed by a document processing device to convert a command stream describing multiple copies of a document into a print job.
Figure 6:
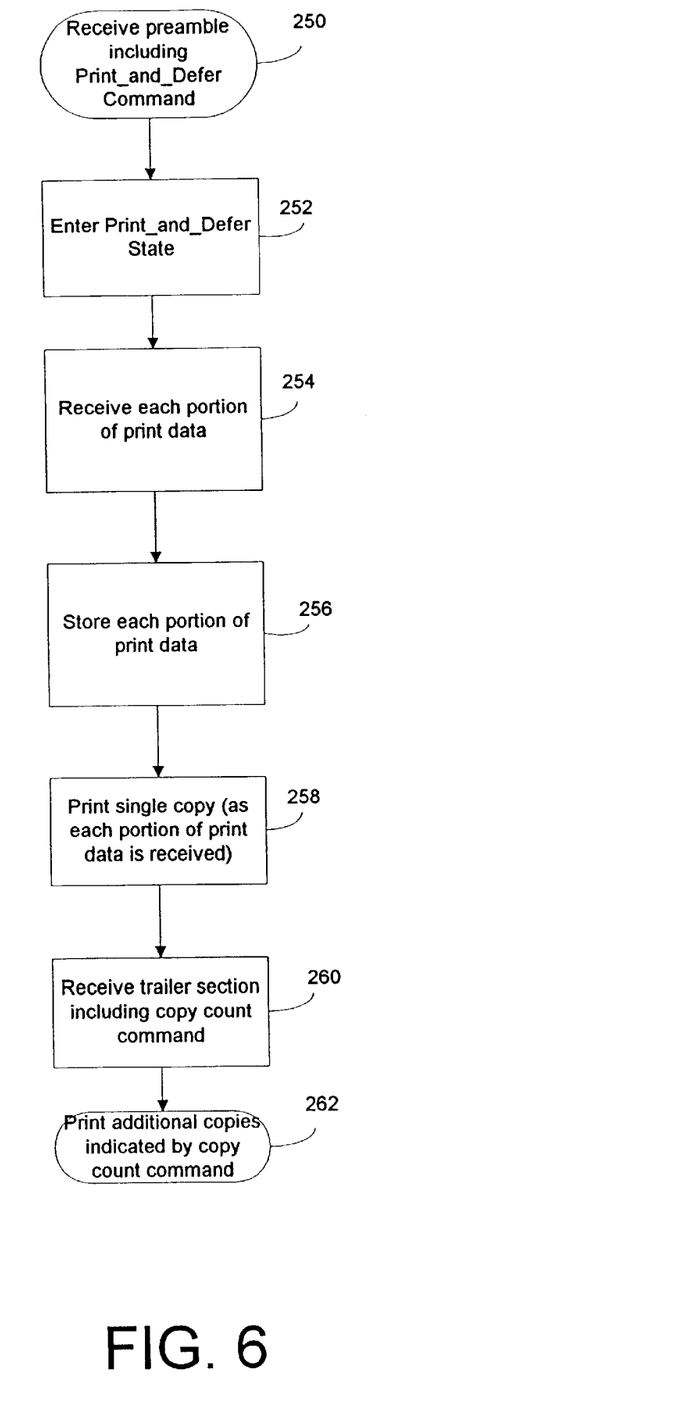
FIG. 6 is a flow diagram for illustrating the operation of a printer in accordance with the present invention.

Turning now to FIGS. 4–6, a second embodiment of the present invention is now described. FIG. 4 illustrates a printing system 102 that includes a document processing device (computer 104) and printer 110 connected over network 108. As shown, computer 104 includes memory 106 and printer 110 includes memory 112.

As will be explained in greater detail below, printer 110 is able to receive and to respond to a print job having a command structure generally indicated in Table 2. In this embodiment, these commands are expressed in Printer Job Control Language (PJL).

TABLE 2

| Print Job command structure | Comments |
|---|---|
| @ PJL Job | Preamble section |
| @ PJL SET_HOLD = PRINT_AND_DEFER | |
| {rest of preamble section} | |
| {print data} | Print Data Section (e.g., PCL or Postscript) |
| @ PJL COPY_COUNT = Copy count value | Trailer section |
| {rest of trailer section} | |
| @ PJL EOJ | |

It is understood that the "@PJL SET_HOLD=PRINT_AND_DEFER" represents an extension to the current PJL command set. This command is generally referred to herein as a "Print_and_defer" command. Furthermore, the "@PJL COPY_COUNT=Copy Qty" is the copy count command. Importantly, it can be seen that the copy_count command is in the trailer section of the print job. The response of printer 110 to these commands is discussed in detail below.

FIG. 5 illustrates, in the form of a flow diagram, a routine followed by computer 104 for converting an undifferentiated DDI command stream into a mopy print job. It is assumed that the undifferentiated DDI command stream is generated by a non-mopy application (in response to user input) and describes multiple collated copies of a document. It is noted that this routine may be implemented by computer 104 executing one or more software programs, or via a state machine device that makes use of combinatorial logic circuits or by both software and state machine.

Referring now to FIG. 5, the routine begins upon computer 104 detecting that the undifferentiated command stream is being generated (step 150). Upon detecting the command stream, computer 104 generates and transmits to printer 110 the preamble section of a print job (step 151). Importantly, the preamble section includes a print_and_defer command. As will be described in greater detail below, the print_and_defer command places printer 110, for the current print job, into a "print_and_defer" state.

After or during the transmission of the print job preamble, computer 104 operates to identify the marking data for the first page represented in the command stream (step 152). As indicated above, this page is the first page (first copy) of the document. Also indicated above, the marking data for the first page may be identified by parsing the command data describing each marking command for the first page represented in the command stream. As the first page marking data is identified, computer 104 operates to calculate and store into memory 106 a CRC value for the first page marking data (step 154).

Importantly, as steps 152 and 154 are performed, computer 104 also operates to convert the DDI commands (i.e., the page descriptions commands) that describe the first page represented in the command stream into print data and to transmit the print data over network 108 to printer 110 (step 156).

Computer 104 then preforms an iterative operation to determine the very next page represented in the command stream that meet two criteria. That page is assumed to be the first page (second copy) of the document.

The iterative operation begins upon computer 104 identifying the marking data for a current test page (iterative step 157). For this first iteration, the current test page is the next page represented in the command stream after the first page. Computer 104 then calculates a CRC value for this set of marking data and stores it into memory 106 (iterative step 158).

Computer 104 then determines if the current test page meets the two criteria (decision step 160). A current test page meets the first criterion if it is identical to the first page in the document. In order to make this determination, Computer 104 first determines if the marking data for the current test page is identical to the marking data for the first page. In this embodiment, this is accomplished by computer 104 determining if the CRC value calculated for the first page is equal to the CRC value calculated for the current test page. If computer 104 determines that the two CRC values are equal, then the current test page is determined to meet the first criteria (i.e., the current test page is determined to be identical to the first page of the document).

In order to determine if the current test page meets the second criterion, computer 104 tests one or more associated page sets. For a given associated page set, the test determines if the page set consists of identical pages. The test may be performed by first identifying the marking data for each page in an associated page set. A CRC value is then calculated for each page in the set. Computer 104 then determines if the CRC values for each page are equal. If so, then the pages in the set are determined to be identical and the associated page set "passes" the test. If not, the associated page set "fails" the test.

Computer 104 determines that the current test page meets the second criterion if each associated page set that is tested passes the test. As in the first embodiment, it is again noted that the number of associated page sets that are tested before computer 104 determines that the current test page meets the second criteria is a design choice. In addition, the number of pages in an associated page set is also a design choice. In this embodiment, an associated page set includes two pages (in other embodiments, an associated page set may include more than two pages). The first associated page set that is tested includes the first page represented in the command stream after the current test page and the corresponding page represented before the current test page. Thus, if the current test page is the fourth page represented in the command stream, then the first associated page set that is tested consists of the fifth page and the second page represented in the command stream. Whether or not a second associated page set is tested is dependant upon whether or not the first associated page set consists of pages that are not blank. If the associated page set consists of pages that are not blank, then computer 104 does not test additional associated page sets. If the first associated page set consists of blank pages, then computer 104 tests a second associated page set. The second associated page including the second page represented in the command stream after the current test page. This continues in a similar manner until computer 104 tests an associated page set that consists of pages that are not blank or the supply of pages are exhausted.

If computer 104 determines that the current test page does not meet the first and second criterion (decision step 160), then the DDI commands that describe the current test page are used to generate print data for that page and the print data is transmitted to printer 110 (iterative step 162). This iterative operation is repeated until a current test page is identified that meets the first and second criteria or until the pages are exhausted. If at any time the pages being tested are exhausted, computer 104 determines that the command stream describes only a single copy of the document.

Upon computer 104 determining that a current test page meets the first and second criterion (decision step 160) a copy count value is then determined (step 164). This may be determined by counting the total number (first count) of pages represented in the command stream prior to the current test page that passed the first and second test. In addition, the overall number of pages represented in the command stream is also counted (second count) The copy count value is then set equal to the second count divided by the first count.

After the copy count value is determined, computer 104 then transmits the trailer section of the print job to printer 110 (step 166). The trailer section including a copy_count command indicating the copy count value.

Referring to FIG. 6, the operation of printer 110 is now described as the PJL commands and print data is received from computer 104. As shown, the operation of printer 110 begins upon receiving the preamble section of the print job from computer 104 (step 250). As previously indicated, the preamble section includes a "print_and_defer" command. Printer 110 responds to this command by entering a print and defer state (step 252). In general, while in a print and defer state, printer 110 is adapted to store print data as it is received into storage area 112 and to convert the print data into printed output.

Thus, as the print data is received from computer 104 (step 254), printer 110 operates to store it into storage area 112 (step 256) and to use it to print a single copy of the document (step 258).

After or during the printing of the single copy of the document, printer 110 then receives the trailer section of the print job (step 260) from computer 104. As indicated above, the trailer section includes the copy_count command indicating the copy_count value. Printer 110 responds to this command by using the stored print data to generate the additional copies indicated by that command (step 262). Thus, for example, if the copy count value is equal to "ten", then printer 110 performs step 162 by generating nine copies so that a total of ten copies are printed for the current print job.

It can be seen from this second embodiment, that the present invention combined with the '346 application can result in improved printing system performance. In part, this is because printer 110 can receive print data prior to receiving the copy count command. Thus, as computer 104 operates to identify the DDI commands for each page in the document, these commands can be converted to print data immediately and transmitted to printer 110 for printing. As Printer 110 receives this print data it can operate in parallel with computer 104 to print the first copy of the document.

Figure 7:
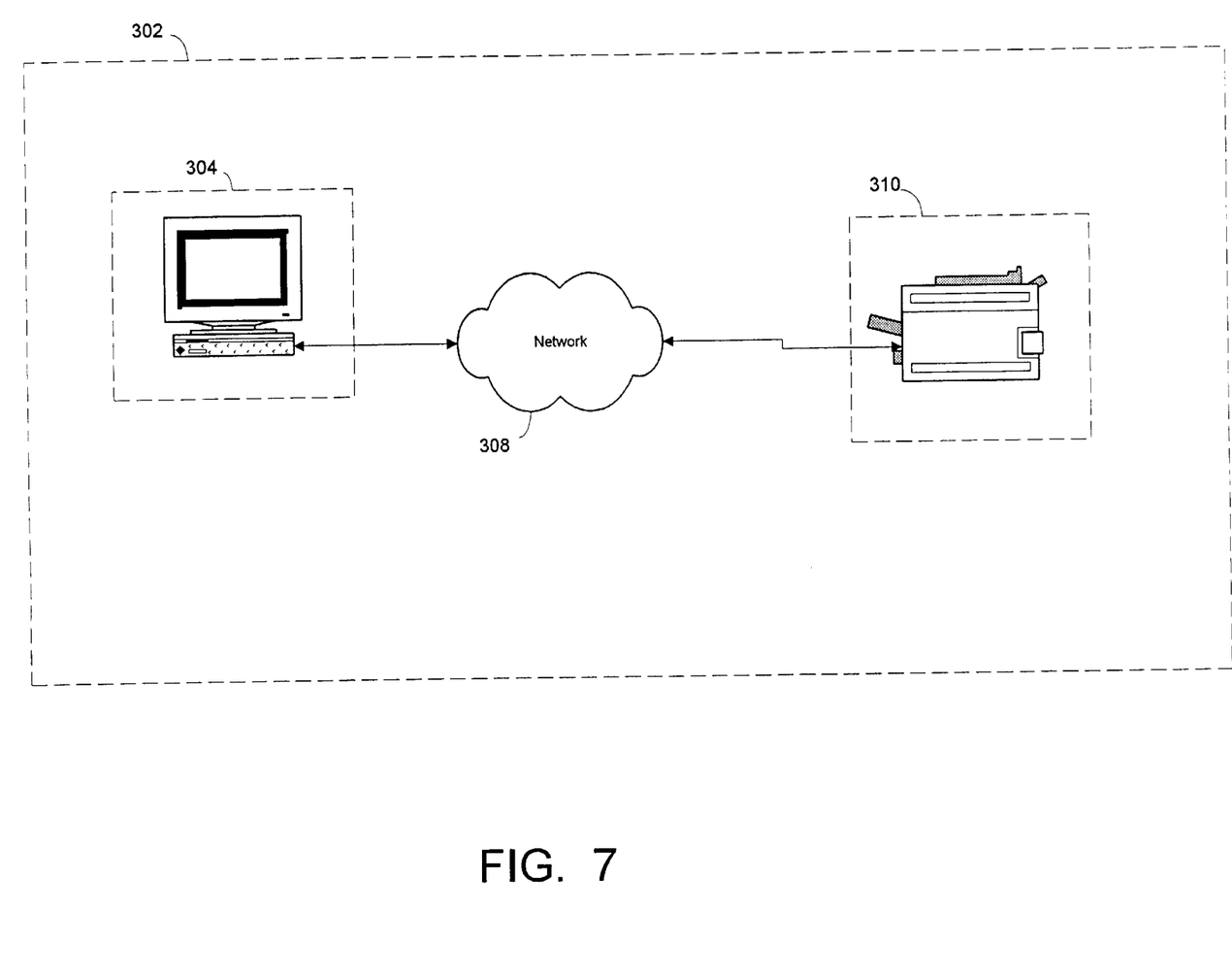
FIG. 7 illustrates a printing system incorporating another embodiment of the present invention.

To illustrate a second aspect of the present invention, consider yet another embodiment of the present invention in the form of printing system 302 depicted in FIG. 7. As shown, printing system 302 includes a computer 304 connected over network 308 to mopy printer 310. It is assumed that computer 304 includes a non-mopy application and a prior art mopy print driver. As a result of input by a user to the non-mopy application, computer 304 generates and transmits a mopy print job to printer 310 via network 308. Importantly, the mopy print job includes print data that represents an undifferentiated command stream. Thus, the print data describes multiple copies of a document, but there is no indication where one copy ends and another begins.

Figure 8:
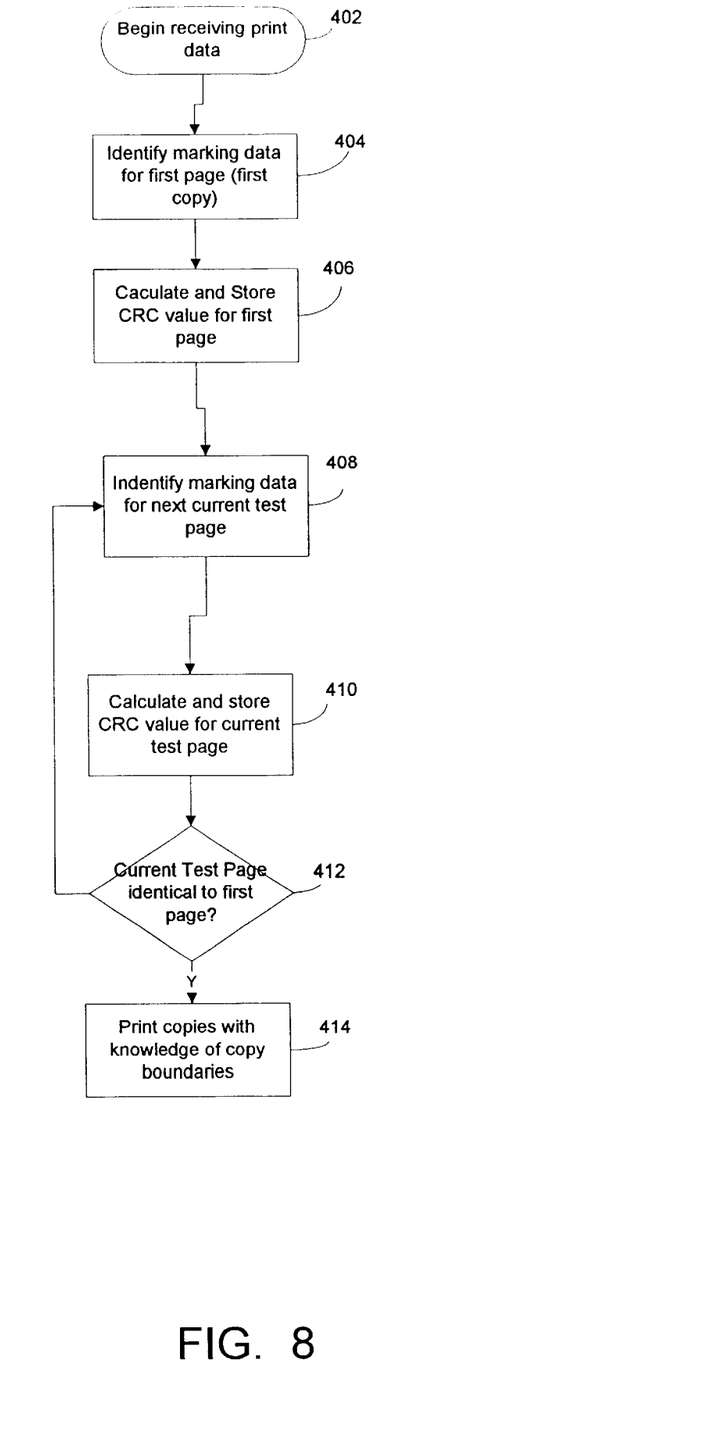
FIG. 8 is a flow diagram flow diagram for illustrating the operation of a printer in accordance with the present invention

FIG. 8 provides a control routine followed by printer 310 as the print data for the mopy print job is received. It is understood that this control routine may be implemented by one or more software routines executing on one or more microprocessors in printer 310. Alternatively, the control routine may also be implemented by one or more state machines states consisting of combinatorial logic circuits, or by combination of software and state machine.

As shown in FIG. 8, upon receiving the print data command stream (step 402) printer 310 identifies the marking data for the first page represented in the command stream (step 404). Printer 310 then calculates and stores a CRC value for first page print data (step 406).

Printer 310 then follows an iterative routine to determine the very next page in the print data command stream that is identical to the first page. First, printer 310 identifies the marking data for the current test page (iterative step 408). Printer 310 then calculates and stores a CRC value for the current test page marking data (iterative step 410). Printer 310 then determines if the current test page is identical to the first page by determining if the first page CRC value is identical to the current test page CRC value. If not, then the next page represented in the command stream is tested as just described (decision step 412). These iterative steps are repeated until a current test page is identified that is determined to be identical (decision step 412). This page is assumed to be the first page (second copy) of the document. Once the first page (second copy) of the document is identified, it follows that the commands describing each document copy can then be identified and the number of document copies can also be determined (step 414). Importantly, with this information, printer 310 then proceeds to print each document copy in a collated form. Thus, for example, finishing operations (e.g., stapling) or other operations that require knowledge of copy boundaries are correctly applied.

It should be understood that the foregoing description is only illustrative of the invention. Various alternatives and modifications can be devised by those skilled in the art without departing from the invention. For example, in the first embodiment described above, the document processing device operated to identify the single copy command set and the copy_count command. This operation was accomplished under the direction of the same program that converted the DDI commands into print data (i.e., the print driver). It is understood, however, that one or more separate programs, or one or more state machines consisting of combinatorial logic circuits or combination of program and state machine may be implemented to perform the present invention.

In addition, the embodiments described above determines if two sets of marking data are identical by determining if a CRC value for each set of marking data are equal. As mentioned above, and reemphasized here, there are many other suitable techniques that are known in the art that may be used to determine if two sets of marking data are identical. Furthermore, the CRC value is determined in both embodiment by operation of a software program. However, the CRC value could also be determined by a state machine consisting of combinatorial logic circuits.

It is also noted that the routine described with reference to FIG. 8 may be implemented in whole or in part by any number of document processing devices such as a print server. Accordingly, the present invention is intended to embrace all such alternatives, modifications and variances that fall within the scope of the appended claims.

What is claimed is:

1. A method of generating a print job from an undifferentiated command stream describing a plurality of copies of a document, comprising:

(a) identifying marking data for a page in said document, (b) using said marking data to identify a single set of commands in said command stream describing said document; and (d) using said single set of commands to generate said print job.

2. The method of claim 1, wherein said page is a first page represented in said command stream.

3. The method of claim 2, further comprising:

(e) using said marking determine a number of said copies described in said command stream; and (f) using said number to generate said print job.

4. The method of claim 3, wherein said print job includes print data describing only a single copy of said document.

5. The method of claim 4, wherein said print job includes a preamble section, print data and a trailer section, said preamble section including a Print_and_defer command and said trailer section including a copy_count command indicating said number.

6. The method of claim 5, wherein step (b) includes the substeps of:

(i) using said marking data to identify a next page represented in said command stream that is identical to said first page; and (ii) identifying said single set of commands as those commands describing each page represented in said command stream before said next page.

7. The method of claim 1, wherein steps (a)–(d) are performed by a computer.

8. A document processing device for generating a print job from an undifferentiated command stream describing a plurality of copies of a document, comprising:

(a) means for identifying marking data for a page represented in said command stream, (b) means for using said marking data to identify a single set of commands in said command stream, said single set of commands describing said document; and (c) means for using said single set of commands to generate said print job.

9. The document processing device of claim 8, wherein said page is a first page represented in said command stream.

10. The document processing device of claim 8, wherein said print job includes a preamble section and a trailer section, said preamble section including a print_and_defer command and said trailer section including a copy_count command indicating a number of copies that are to be printed.

11. The document processing device of claim 10, further comprising:

(e) means for using said marking data to determine said number.

12. A computer-readable medium having computer-executable instructions for performing steps to generate a print job from an undifferentiated command stream describing a plurality of copies of a document, said steps comprising:

(a) identifying marking data for a page in said document, (b) using said marking data to identify a single set of commands in said command stream describing said document; and (c) using said single set of commands to generate said print job.

13. The computer-readable medium of claim 12, wherein said page a first page represented in said command stream.

14. The computer-readable medium of claim 13, said steps further comprising:

(e) using said marking data to determine a number of said copies described in said command stream; and (f) using said number to generate a copy count command indicating said number;

(g) including said copy count command in said print job.

15. The computer-readable medium of claim 14, wherein said print job includes print data describing only a single copy of said document.

16. The computer-readable medium of claim 15, wherein said print job includes a preamble section, a print data section and a trailer section, said preamble section including a print_and_defer command and said trailer section including said copy_count command.

17. The computer-readable medium of claim 16 wherein step (b) includes the substeps of:

(i) identifying a test page represented in said command stream that meets at least a first criteria, said at least a first criteria being said marking data for said page is identical to said first page; and (ii) identify said single set of commands in said command stream as those commands describing each page represented in said command stream before said test page.

18. A document processing device, comprising:
(a) print job receiver, said print job including print data describing a plurality of copies of a document;
(b) means for identifying marking data for a page represented in said print data;
(c) means for using said marking data to identify a first portion of said print data describing a single copy of said document.

19. The document processing device of claim 18, wherein said document processing device is a printer.

20. The document processing device of claim 18, further comprising:
(d) means for using said marking data to print each copy of said document in a collated form.

* * * * *

UNITED STATES PATENT AND TRADEMARK OFFICE
CERTIFICATE OF CORRECTION

PATENT NO. : 6,608,693 B1
DATED : August 19, 2003
INVENTOR(S) : Gerald A. Loyd et al.

It is certified that error appears in the above-identified patent and that said Letters Patent is hereby corrected as shown below:

Column 2,
Line 26, delete "copy count" and insert therefor -- copy_count --

Column 3,
Line 61, delete "table" and insert therefor -- Table --

Column 4,
Line 21, delete "computer readable" and insert therefor -- computer-readable --
Line 62, after "invention" insert -- . --

Column 5,
Line 6, delete "control" and insert therefor -- Control --

Column 10,
Line 1, delete "copy count" and insert therefor -- copy_count --
Line 55, delete "Computer" and insert therefor -- computer --

Column 11,
Lines 57 and 60, delete "copy count" and insert therefor -- copy_count --

Column 13,
Line 56, after "marking" insert -- data to --

Signed and Sealed this

Twenty-fifth Day of January, 2005

JON W. DUDAS
*Director of the United States Patent and Trademark Office*